Patented Oct. 22, 1940

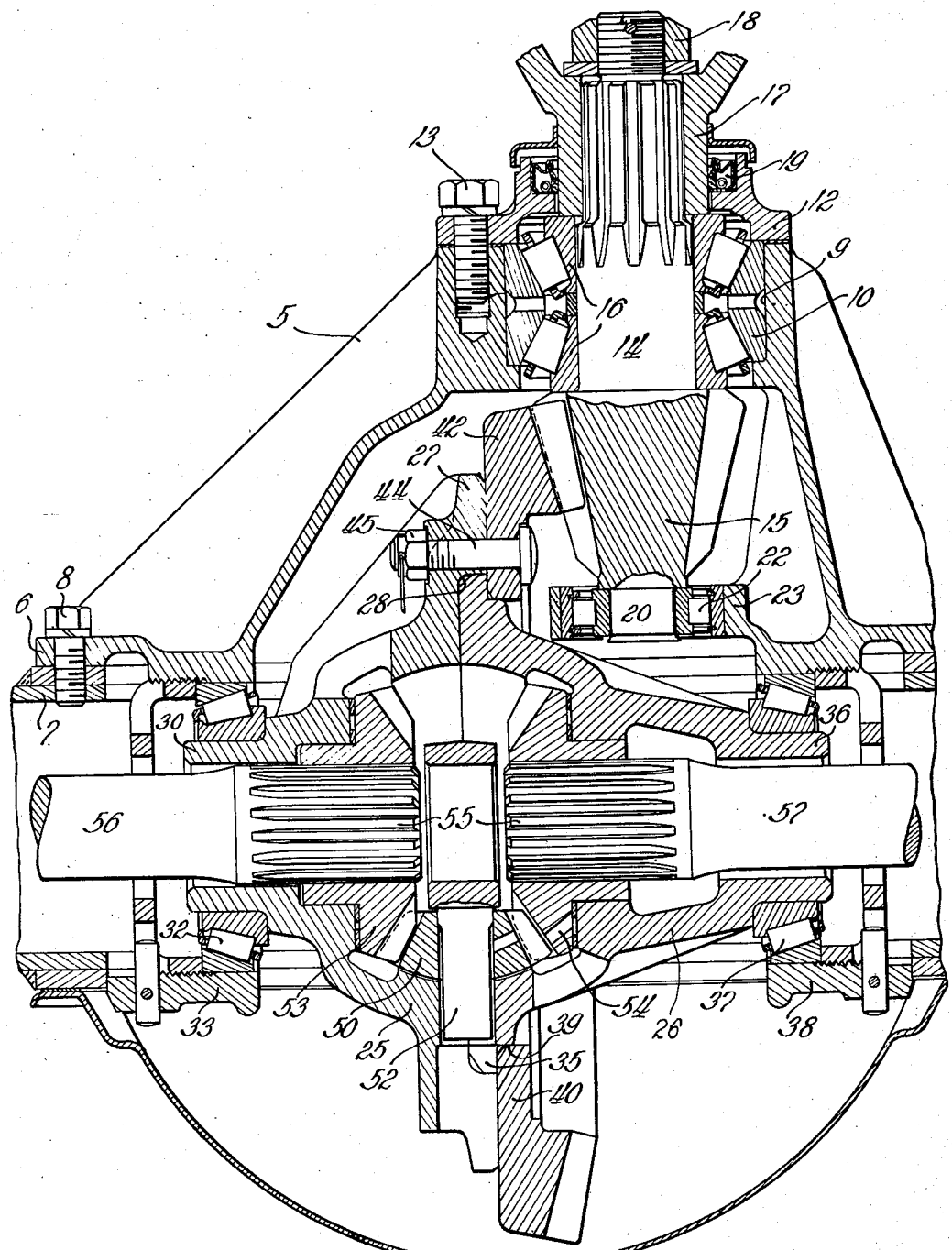

2,219,025

UNITED STATES PATENT OFFICE 2,219,025

DIFFERENTIAL MECHANISM

Glen C. Vanderberg, Buchanan, Mich., assignor to Clark Equipment Company, Buchanan, Mich., a corporation of Michigan Application January 25, 1940, Serial No. 315,480

7 Claims. (Cl. 74—311)

This invention relates to differential mechanisms, and more particularly is concerned with differentials of the type used on rear axles of automotive vehicles and the like in which a pinion shaft driven from the transmission is adapted to drive a ring gear connected to a differential case containing differential mechanisms for driving the axle shafts.

One of the primary objects of the present invention is to eliminate the use of two sets of securing means in the differential case, one for securing the ring gear to the case and the other for securing the two portions of the case together. The invention is primarily concerned with that type of differential case in which the case itself is composed of two parts forming receiving means for the axle shafts and the side gears which drive these shafts.

Formerly it has been the practice to use a circumferential series of bolts for tieing the two halves of the case together, and one of the case portions has normally been provided with a radially extending shouldered flange to which is secured the ring gear by either a series of rivets or other securing means.

The present invention contemplates the elimination of the securing means formerly used to hold the two halves of the case together, and provides for clamping these two case portions together by the same securing means which secures the ring gear to the flange of one of the case members. However, the securing means has no contact whatever with the other case member, this case member being of such radial extent as to be entirely disposed within the bolt circle of the ring gear securing means.

This provides a very cheap and economical means for securing the two case pieces together, eliminates the necessity of a second series of bolts or studs, and allows for the provision of a compact, easily assembled and disassembled differential mechanism which, however, is rigidly held together in assembled position to perform all of the functions desired therein.

Other objects and advantages of the present invention will appear more fully from the following detailed description which, taken in conjunction with the accompanying drawing, will disclose to those skilled in the art the particular construction and operation of a preferred form of the invention.

In the drawing, which is a sectional view through a differential mechanism embodying the present invention, there is disclosed a differential carrier 5 having a peripheral flange portion 6 by which the carrier may be bolted to the banjo portion 7 of an axle housing, as by means of the studs 8. The carrier 5 is provided with an integrally formed cylindrical recess or opening 9 within which is disposed the outer race 10 of a double tapered bearing assembly, the race 10 being locked in position by means of the bearing cap 12 bolted to the face of the recess 9 by means of the studs 13. A suitable pinion shaft 14 having the hypoid pinion 15 formed adjacent one end thereof is mounted within the bearing assembly, the inner bearing races 16 being mounted on the shaft 14 between the gear portion 15 and the hub portion 17 of a universal joint flange which is secured to the splined end of the shaft by means of the nut 18. Suitable sealing means 19 is provided about this hub portion to prevent oil leakage therepast. The shaft 14 beyond the pinion portion 15 is provided with a short stud portion 20 carrying a bearing assembly 22 retained in the bearing recess formed in the web 23 of the differential carrier 5.

The differential mechanism comprises a two-piece case having the case portions 25 and 26, the case portion 25 being provided with a radially extending flange 27 terminating in an axially inwardly recessed shouldered face 28. The case portion 25 is of generally conical form and terminates adjacent its small end in the bearing sleeve portion 30 about which is disposed the bearing assembly 32 journalling this portion of the differential case in the bearing journal formed by the carrier 5 and the bearing journal cap 33, which is bolted thereto in a conventional manner. The opposite case portion 26 is also provided with a radial flange 35 which, however, is of considerably smaller diameter than the flange 27, and is adapted to be piloted in the recessed shoulder portion 28 of the member 25, whereby the members 25 and 26 are piloted into accurate axial alinement.

The member 26 is also of conical form but of greater axial length than the member 25 and terminates in a bearing sleeve portion 36 journalled in the bearings 37 carried by the carrier 5 and bearing journal cap 38 in a conventional manner. The flange 35 of the member 26 is provided with the axial annular shoulder portion 39 extending axially away from the member 25 and forming an annular shoulder upon which is piloted the flanged portion 40 of a hypoid ring gear 42 adapted to be engaged by the hypoid pinion 15 on the shaft 14. It will be seen that the inwardly etxending flange portion 40 of the ring gear 42 therefore clamps the flange 35 of the case part 26 against the recessed shoulder 28, and firmly holds it in position, the ring gear being held securely against the face of the flange 27 by means of a circumferential series of bolts 44 engaged by nuts 45 for effecting this clamping pressure. It should be noted that the studs 44 are disposed radially outwardly of the peripheral edge of the flange 35 so that the flange at no time comes into contact with the studs 44 but is merely clamped by reason of the flanges 40 and 27 in the annular groove formed therebetween by the recessed shoulder 28.

Disposed within the differential case thus formed are the pinion gears 50 mounted upon the pinion spider 52 and having meshing engagement with the side gear members 53 and 54, respectively, which members have internally splined hub portions adapted to receive the splined ends 55 of a pair of axle shafts 56 and 57. This comprises the differential part of the driving mechanism as the pinion gears 50 control the differential action between the shafts 56 and 57. The case members 25 and 26 have mating recesses in the faces thereof forming retaining means for the spider arms and also thereby restraining the case members against relative rotation.

It will be noted that the differential assembly is split along the center line of the pinion shafts 52 or through the axis of the pinion gears.

It will be apparent that by the clamping of the radial flange or lip 35 of the case part 26 within the annular channel shaped radially inwardly directed groove formed between the flange 40 of the ring gear and the recessed shoulder 28 of the case part 25, the member 26 is securely held against either axial or radial movement relative to the case part 26, and consequently the two case parts can be accurately alined for receiving the differential mechanism and, of course, are securely supported by means of the bearing assemblies 32 and 37 against any possibility of cocking movement.

It will be apparent that the bolts 44 thus serve to retain the case closed as well as to support the ring gear 42 on the case, and consequently loosening of this one set of bolts will result in disassembly of the entire differential mechanism for inspection, replacement or repair.

I am aware that various changes may be made in certain details of the present construction, and I therefore do not intend to be limited except as defined by the scope and spirit of the appended claims.

I claim:

1. In a differential, a two piece differential case, one case member having a radially extending flange and an axial recess in the face thereof, the other case member having a radial lip piloted in said recess, a ring gear disposed against said flange face and extending radially inwardly to overlie said lip and confine it in said recess, and means extending through said flange and gear for clamping them together disposed radially outwardly beyond said lip.

2. A differential case construction comprising a first case member terminating at one end in a radial flange face, a radially inwardly disposed axial recess in said face, a second case member terminating in a radial lip adapted to seat in said recess and confined radially therein, a ring gear having a radial flange portion engaging said flange face and extending radially inwardly to overlie said lip, and means clamping said ring gear to said flange face disposed radially outwardly of said lip.

3. A differential case comprising two case members terminating at adjacent ends in radial flanges, one of said flanges having an axial recess in the face thereof adapted to receive the flange of the other member, a ring gear secured to the face of said one flange and extending radially inwardly to overlie said other flange for confining said other flange against axial displacement out of said recess, and a circumferential series of bolts clamping said gear to said one flange face disposed radially outwardly beyond the periphery of said other flange.

4. A differential comprising two conically shaped case members terminating at their smaller ends in cylindrical sleeves, a differential carrier having bearing journals receiving said sleeves, one of said members terminating at its large end in a radially outwardly extending flange having an axially directed recess in the face thereof, a ring gear having a radial face secured to said flange face and extending radially inwardly to overlie said recess to form a radially inwardly directed channel therewith, and a radial lip on said second case member radially and axially confined in said channel.

5. The combination of claim 4 further characterized in the provision of a pinion spider, and mating recesses in the faces of said case members receiving and supporting the arms of said spider.

6. A differential case comprising two case members terminating at adjacent ends in axially telescoped radial flanges, and a ring gear having a radial flange face secured to the outer case flange and overlying the inner case flange to confine the latter in position.

7. The combination of claim 6 further characterized in that said gear flange is secured in position by a circumferential series of bolts disposed radially outwardly of the periphery of the inner case flange.

GLEN C. VANDERBERG.